(12) United States Patent
Czornij et al.

(10) Patent No.: US 7,649,044 B2
(45) Date of Patent: Jan. 19, 2010

(54) AUTOMOTIVE COATINGS COMPRISING PULVERIZED RUBBER

(75) Inventors: Zenon Paul Czornij, Brighton, MI (US); Dan Waldon, Farmington Hills, MI (US)

(73) Assignee: BASF Coatings AG, Muenster (DE)

( * ) Notice: Subject to any disclaimer, the term of this patent is extended or adjusted under 35 U.S.C. 154(b) by 664 days.

(21) Appl. No.: 11/534,318

(22) Filed: Sep. 22, 2006

(65) Prior Publication Data

US 2008/0075952 A1    Mar. 27, 2008

(51) Int. Cl.
*C09D 163/00* (2006.01)

(52) U.S. Cl. .................. 524/508; 524/509; 524/512; 524/523; 524/525

(58) Field of Classification Search .......... 524/508, 524/509, 512, 513, 523, 525
See application file for complete search history.

(56) References Cited

U.S. PATENT DOCUMENTS

| | | | |
|---|---|---|---|
| 3,962,168 A | 6/1976 | Edwards | |
| 4,866,116 A | 9/1989 | Ek et al. | |
| 5,234,988 A * | 8/1993 | Brooks et al. | ............... 524/526 |
| 5,254,405 A * | 10/1993 | Panaroni et al. | ............. 428/327 |
| 5,371,136 A | 12/1994 | Brooks et al. | |
| 5,883,182 A | 3/1999 | Hunt | |
| 5,925,466 A | 7/1999 | Burton | |
| 5,985,366 A | 11/1999 | Wright | |
| 6,071,043 A * | 6/2000 | Hunt | ..................... 405/129.65 |
| 6,399,670 B1 | 6/2002 | MacQueen et al. | |
| 6,521,706 B1 | 2/2003 | Desai et al. | |
| 2003/0018118 A1 * | 1/2003 | Burnett | ........................ 524/494 |
| 2004/0127636 A1 * | 7/2004 | Yamamoto et al. | .......... 524/588 |
| 2007/0048445 A1 * | 3/2007 | DiMario | ..................... 427/180 |

FOREIGN PATENT DOCUMENTS

WO    9935197 A1    7/1999

* cited by examiner

*Primary Examiner*—Bernard Lipman
(74) *Attorney, Agent, or Firm*—Harness, Dickey & Pierce, P.L.C.

(57) ABSTRACT

A coating composition is disclosed, comprising a binder component having hydroxyl-functional groups; a curing agent having functional groups, wherein the functional groups of the curing agent are reactive with the hydroxyl-functional groups of the binder component; and pulverized rubber, the pulverized rubber having particles with a size suitable for spraying the coating.

31 Claims, No Drawings

AUTOMOTIVE COATINGS COMPRISING PULVERIZED RUBBER

FIELD

The present disclosure relates to automotive coating compositions comprising pulverized rubber and articles made therefrom.

BACKGROUND

The statements in this section merely provide background information related to the present disclosure and may not constitute prior art.

It has been purported that more than 15 million tons of vulcanized rubber products are discarded throughout the world annually. This figure includes 250 million scrap tires that the U.S. Environmental Protection Agency (EPA) estimates are generated in the United States each year. Presently, the Rubber Manufacturers Association (RMA) estimates that between two and three billion scrap tires are currently in landfills or otherwise "stockpiled" in the United States alone. The handling and disposal of this large volume of waste rubber is a significant environmental problem, and the desirability of recycling waste rubber is evident.

One method of recycling waste rubber products has been to pulverize the rubber and form a rubber powder, also known as ground rubber or crumb rubber. Rubber powder is used in various ways, for example in asphalt rubber, ground cover for athletic and recreational activities, soil additives, and new rubber parts, e.g. tires. Recycled rubber is also used in joint or crack sealants. In particular, crumb rubber is used in sealing agents for water and other liquids at tube joints, roofing, point-sealing of ceramic tiles, rubber articles, and metal sheets. In many instances, the use of rubber powder in these applications is economical and results in a cost savings.

Heretofore, the use of crumb rubber in automotive coating applications has been generally limited to adhesives and protective coatings. For example, U.S. Pat. No. 6,521,706 discloses coating compositions comprising an epoxy-functional polymer and ground vulcanized rubber particles suitable for use as adhesives and corrosion inhibiting protective coatings. As disclosed in U.S. Pat. No. 5,925,466, crumb rubber has also been used in protective materials for automotive applications, such as truck bed liners.

The use of crumb rubber is advantageous from an environmental standpoint and, in many instances, is financially desirable. Accordingly, there is a continuing interest in new applications for pulverized rubber.

SUMMARY

The coating compositions, articles, and methods of the disclosure address the aforementioned needs.

A coating composition is provided comprising a binder component having hydroxyl-functional groups, a curing agent having functional groups reactive with the hydroxyl-functional groups of the binder component, and pulverized rubber having particles 200 U.S. mesh or smaller in size.

The disclosed pulverized rubber may be produced by a cryogenic process and exist in the form of flakes or platelets. Pulverized rubber may be present in the coating composition between about 0.5% and about 35% by weight of the total coating composition. The pulverized rubber can comprise additives originally present in the vulcanized rubber, such as sulfur, carbon black, and oils.

In particular, the coatings of the disclosure may include accent coatings for automotive applications. The coatings of the disclosure may have optical and/or tactile effects, including a matte appearance and a subjective "soft feel." When overcoated with a clearcoat, the coating comprising rubber particles may have a leathery appearance. The composition of the disclosure may also be applied as coatings for external claddings and housings, and internal parts such as dashboards and door panels. The coating may further be used as a protective coating, for example as a bed liner or underbody protective coating.

A process for coating articles is further disclosed. In particular, the coating composition of the disclosure can be applied by spraying. Additional coatings, e.g. clear overcoats, may also be applied to the coatings of the disclosure. Curing can occur at ambient temperature or by exposure to thermal energy.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

Further areas of applicability will become apparent from the description provided herein. It should be understood that the description and specific examples are intended for purposes of illustration only and are not intended to limit the scope of the present disclosure.

DETAILED DESCRIPTION

The present disclosure provides a coating composition including a binder component having hydroxyl-functional groups, a curing agent having functional groups reactive with the hydroxyl-functional groups of the binder component, and pulverized rubber.

The binder component of the disclosure comprises a polymer or resin having hydroxyl-functional groups. Preferably, the binder comprises a hydroxyl-functional vinyl polymer. The hydroxyl-functional polymer of the disclosure is preferably formed by addition polymerization of monomers comprising hydroxyl-containing acrylate monomer, hydroxyl-containing methacrylate monomer or mixtures thereof. Suitable hydroxyl-functional acrylate polymers also include copolymers of at least one of hydroxyethyl acrylate, hydroxyethyl methacrylate, 2-hydroxypropyl acrylate, 3-hydroxypropyl acrylate, 3-hydroxypropyl methacrylate, hydroxyisopropyl acrylate, 4-hydroxybutyl acrylate and/or glycerol monoacrylate.

The hydroxyl-functional components of the disclosure may also be made by condensation of a polyisocyanate compound with a reactive compound having more than one hydroxyl group, or at least two hydroxyl groups and one active hydrogen-containing amino group. Generally, the reactive compound may have an excess of hydroxyl groups in comparison to the isocyanate groups on the polyisocyanate. When a polyisocyanate compound is condensed with a compound having an excess of hydroxyl groups, a hydroxyl-functional polyurethane compound is made. Additionally, it is known that the active hydrogens of amino groups react much faster than hydroxyl groups with isocyanates. Because the reaction of amine with isocyanate is much faster than that of hydroxyl, the predominant linkage formed in the reaction product will be ureas, and the unreacted hydroxyl groups become functional hydroxyl groups on the compound. With a reactive compound having one amino group, two or more amino alcohols per diisocyanate may also be reacted to provide a monomeric hydroxyl-functional compound.

Hydroxyl-functional polymers may additionally comprise polyester polyol polymers. Polyesterpolyol polymers may be made by condensation of polyols and polycarboxylic acids. Specific examples of suitable polyols include ethylene glycol, 1,6-hexanediol, neopentyl glycol, and 2,2-dimethyl-3-hydroxypropionate. Other suitable polyols include hydrogenated bisphenol A, cyclohexanediol, cyclohexanedimethanol, caprolactone-based diols such as the reaction product of ε-caprolactone and ethylene glycol, hydroxy-alkylated bisphenols, polyether glycols such as poly(oxytetramethylene) glycol, mixtures thereof and the like. Suitable polycarboxylic acids may include aliphatic and/or aromatic dicarboxylic acids, e.g. malonic acid, maleic acid, succinic acid, glutaric acid adipic acid, azelaic acid, anhydrides thereof, and combinations thereof.

Although the polyol component of the hydroxyl-functional polymer may be comprised only of diols, such as urethane polyols or polyester polyols, polyols of higher functionality may also be used. In one exemplary embodiment, the polyol component will be a mixture comprising at least one diol and at least one polyol of higher functionality such as a triol. Examples of polyols of higher functionality would include trimethylolethane, trimethylolpropane, pentaerythritol, and the like. Limited amounts of monofunctional alcohols, such as ethylhexanol, may also be used.

The binder component of the coating composition of the disclosure may comprise a nonaqueous dispersion having a dispersed phase that may include particles of hydroxyl-functional polymer, the particles of the dispersed phase being stably dispersed in a continuous phase. The term "stable" means that the dispersed phase does not settle, agglomerate, or precipitate upon standing. The solvent forming the continuous phase may be any medium into which the dispersion of polymer particles will form a stable dispersion and not flocculate or swell.

Nonaqueous dispersions are well known in the art, and any process known in the art for making nonaqueous dispersions may be used to form the hydroxyl-functional nonaqueous dispersions of the disclosure. As a nonlimiting example, the hydroxyl-functional polymers of the dispersed phase may be prepared by non-aqueous emulsion polymerization of monomers carried out in a solvent. Suitable nonaqueous dispersions may also be acquired commercially, for example from Nuplex Resins.

Non-aqueous dispersions may be used to control the rheology of the coating compositions of the disclosure. In particular, non-aqueous dispersions may aid in the orientation of crumb or pulverized rubber through film shrinkage that may occur during drying and curing of the applied coating composition.

The curing agent of the disclosure has functional groups including, for example, active alkylol (e.g., methylol or methylalkoxy), isocyanate, carboxyl, amine, silane, and acetoacetate groups. Reactive functional groups may be masked or blocked in such a way so that they are unblocked and available for the reaction under the desired conditions, generally at elevated temperatures. As nonlimiting examples, the curing agent may include an aminoplast resin, polyisocyanate and blocked polyisocyanate compounds and oligomers (including uretdiones and isocyanurates), and acid- or anhydride-functional curing agents.

Aminoplast resins are preferred for use as curing agents of the coating composition. Suitable aminoplast resins are obtained from the condensation of an aldehyde with an amine or amide. The most commonly used amines are urea, melamine, or benzoguanamine, with melamine and/or urea preferred. While the aldehyde used is most often formaldehyde, other aldehydes such as acetaldehyde, crotonaldehyde, and benzaldehyde may be used. For example, the condensate of urea with formaldehyde is a suitable aminoplast. Another suitable aminoplast resin is hexamethoxymethylmelamine, a liquid resin available from Cytec Industries, Inc as CYMEL® 303. Mixtures of the aminoplast resins may also be used.

Although aminoplast resins are preferred, the curing agent may include any compound, oligomer, polymer or resin having functional groups reactable with the hydroxyl-functional groups of the binder component. For instance, the curing agent may comprise isocyanate functionality or blocked-isocyanate functionality. Suitable isocyanate-functional and blocked-isocyanate compounds and oligomers are well known in the art.

An isocyanate-functional curing agent may be selected from a wide variety of isocyanates including, but not limited to, aliphatic isocyanates, cycloaliphatic isocyanates, aromatic isocyanates, pre-polymers based on either aliphatic or aromatic isocyanates, and combinations thereof. Preferably, the isocyanate curing agent has at least two isocyanate-functional groups, and more preferably at least three isocyanate-functional groups available for reaction with the hydroxyl-functional binder of the disclosure.

Blocked-isocyanate compounds are typically used in thermosetting coating compositions when it desired that the isocyanate group be unreactive with the isocyanate-reactive components of the coating composition until the composition is heated to a temperature at which the blocking agent compound unblocks and volatilizes. Nonlimiting examples of suitable blocking agents may include alcohols, phenol, ketoximes, and the like.

The coating composition of the disclosure further includes pulverized rubber. Pulverized rubber or crumb rubber powder may be produced from recycled waste rubber products. The term "mesh" is commonly used to describe or measure the size of crumb rubber, and mesh designations as used herein can be defined by ASTM standards D-5603 and D-5644, incorporated herein by reference. Pulverized rubber is sized by the screen through which a significant percentage of the particles pass. For example, rubber powder passing through a 10 U.S. mesh screen which retains less than 5% of the powder may be designated as 10 U.S. mesh, or a maximum particle dimension of 2000 microns. Pulverized rubber having a particle size of 10 U.S. mesh or smaller is generally known in the art as "ground rubber."

The pulverized rubber of the disclosure comprises rubber particles having at least about a 200 U.S. mesh particle size, or less than 74 microns in maximum dimension. It should be understood that for 200 U.S. mesh or smaller, a maximum of 15% rubber particles may be retained on the screen. Preferably, the pulverized rubber comprises about 230 U.S. mesh particles, or 63 microns or less in maximum dimension. It should also be understood that the particle size of the rubber particles is of particular importance to the sprayability of the coating. For optimum sprayability, the preferred particle size is less than 74 microns (about 200 U.S. mesh), and more preferably less than about 63 microns (230 U.S. mesh).

The ground rubber of the disclosure is generally produced from used tires. Recycled rubber can come from the tire as a whole, or can be selectively removed from particular tire components, for example from the tread area, the crown area, or the sidewall area. Preferably, the whole tires selected for recycling comprise passenger and light truck tires. The type of rubber obtained from tires is generally a mixture of natural and synthetic polymers, for example styrene-butadiene rubber, natural rubber, synthetic polyisoprene, and polybutadiene. Ground rubber can further include fillers, plasticizers, and additives originally present in the rubber and well known in the rubber industry. As nonlimiting examples, the pulverized rubber used in the disclosed compositions may comprise carbon black, silica, oil, zinc oxide, stearic acid, antidegradants (i.e. antioxidants and antiozonants), and sulfur. Ground rubber may also be provided with a small percentage of partitioning agent, e.g. calcium carbonate or silica, to prevent agglomeration during production, transportation or storage.

It should be understood, however, that the source of ground rubber can be any source of waste rubber, or can be rubber specially treated or formulated for production of ground rubber. Accordingly, sources of vulcanized or cured rubber may include rubber comprising a variety of different polymers and additives. For example, pulverized rubber from tires may be chemically treated, i.e. desulfurized or devulcanized, following removal from the tire to provide a semi-reactive ground rubber product. Additionally, pulverized rubber obtained from non-tire sources may provide alternate coloration as a result of various pigments present in, or added to, the pulverized rubber.

Post-consumer or waste rubber products are generally first reduced by a mechanical size reduction process to manageable pieces known as rubber "chips" by means well known in the art, e.g. cracker mills and granulators. Fiber and extraneous materials are then removed by means such as an air separation, and metal is typically removed by a magnetic separator. Pulverized rubber may then be produced from rubber chips by conventional processes, e.g. hammering or grinding at ambient temperatures or under cryogenic conditions. Ground rubber may also be formed from wet-grinding methods known in the art.

In particular, cryogenic grinding is a known technology for processing waste rubber products at very low temperatures, for example under liquid nitrogen or by commercial refrigeration methods. The rubber is embrittled at these very low temperatures, and then processed, e.g. in a hammermill or granulator, whereby the rubber is shattered and ground to a desired product size. As opposed to the amorphous particle shapes produced by ambient or wet grind methods, the cryogenic process produces rubber powder having fairly smooth fracture surfaces. This means that the cryogenic rubber particles generally have a flake or platelet-like particle morphology. Rubber powder produced by the cryogenic method is preferred for the pulverized rubber used in the composition of the disclosure.

Pulverized rubber is present in the coating composition of the disclosure in an amount between about 0.5% and about 35% by weight, more preferably between about 2.5% and about 25% by weight, and most preferably between about 5% and about 15% by weight of the total coating composition. The minimum amount of pulverized rubber in the coating may be any one of 0.5%, 2.5%, and 5%, and the maximum amount may be any one of 15%, 25%, and 35%. The amount of pulverized rubber present in the coating composition may depend upon the particular application of the composition.

The coating composition of the disclosure may comprise solvents. Any non-reactive solvent may be used, including water and polar and nonpolar organic solvents. In one particular embodiment, the solvent may be comprised of water or primarily of water, thus forming an aqueous or waterborne coating composition. In a further embodiment, the solvent may be comprised of organic solvent or primarily of organic solvent, thus forming a solventborne coating composition. Non-limiting examples of useful organic solvents include toluene, xylene, methyl ethyl ketone, methyl isobutyl ketone, mixtures thereof, and the like.

It should be understood that the solvents of the disclosure may include the solvents present in non-aqueous dispersions. Suitable solvents for use in nonaqueous dispersion of the disclosure may be weak, non-polar solvents, e.g. Varnish Makers & Painters (VM&P) Naphtha™ (a distillation cut from petroleum distillates), mineral spirits, Isopar™ I, G, H, and K, Varsol™ solvents, Stoddard™ solvent, hexane and heptane. Further examples may include ester or ketone solvents or mixtures thereof; specifically ethyl acetate or mixtures of ethyl acetate and other suitable ester solvents, n-butyl acetate, n-hexyl acetate, n-pentyl proprionate, Exxate™ 800 or 1000 and the like, and mixtures thereof; ethers such as monoethyl, monobutyl and monohexyl ethers of propylene glycol, and the like; ketone solvents such as methyl ethyl ketone, methyl isobutyl ketone, methyl propyl ketone, diisobutyl ketone and the like, and mixture thereof; mixtures of ester and ketone solvents; and aromatic hydrocarbons such as toluene, xylene, Solvesso™ SC-100, Solvesso SC-150 and the like, and mixtures thereof. It is conventional in this art to add modifier solvents and diluents such as aromatics, esters or ketones to these solvents to provide desired qualities such as the proper solubility and evaporation characteristics.

The coating composition of the disclosure may further comprise additional additives and components such as pigments, fillers, leveling agents, flow modifiers and additives, thixotropic agents, acid catalysts, adhesion modifiers, UV absorbers, HALS compounds, antioxidants, stabilizers, wetting agents, plasticizers, and the like.

The curable coating compositions of the present disclosure can be prepared in a number of ways, including as a one-component composition or as a two-component composition. Two-component curable compositions are typically combined immediately before use. A one-component composition can be prepared in advance of use and stored.

The method of preparing the coating composition of the disclosure may generally be carried out using conventional mixing of the above-described components in appropriate mixing equipment, such as stirred tanks, dissolvers, Ultraturrax, inline dissolvers, toothed-wheel dispersers, pressure release homogenizers, microfluidizers, stirred mills or extruders.

The coating compositions of this disclosure can be applied to an article by any of a number of techniques well known in the art. These include, for example, spray coating, dip coating, roll coating, curtain coating, and the like. Spray coating may be preferred. Spray application methods include, for example, compressed air spraying, airless spraying, and high-speed rotation, alone or in conjunction with hot-spray applications such as hot air spraying.

It should be understood that the sprayability of the coating composition of the disclosure depends upon both the size of the rubber particles of the coating in relation to the diameter of the spraying orifice, and the viscosity of the coating. As a nonlimiting example, the viscosity of the coating composition may be between about 15 seconds and about 30 seconds as measured by a Ford No. 4 viscosity cup. More preferably, the viscosity of the coating composition may be between about 20 and about 25 seconds.

Additional coatings, e.g. conventional clear overcoats, may also be applied to the coatings of the disclosure. The coating composition may also be applied to other coatings, for example a primer coat or undercoat.

Although various methods of curing may be used, including curing at ambient conditions, thermal or heat-curing is preferred. Generally, thermal curing is effected by exposing the coated article to elevated temperatures provided primarily by radiative heat sources. Curing temperatures will vary depending on the particular binder component and curing agent. However, curing temperatures generally range between 93° C. (199° F.) and 177° C. (351° F.), and are preferably between 121° C. (250° F.) and 141° C. (286° F.). The curing time will vary depending on the particular components used, and physical parameters such as the thickness of the coating. Typical curing times may range from approximately 15 minutes to approximately 60 minutes. Generally, curing times will range from about 20 minutes to about 30 minutes.

Curing may take place after a certain rest period. This period may have a duration of from 0 seconds to 2 hours, preferably from 1 minute to 1 hour, and most preferably from greater than 5 minutes to less than 30 minutes. The rest period is used, for example, for leveling and devolatilization of the coat of the coating composition of the disclosure or for the evaporation of volatile constituents such as solvents. The drying that takes place in the rest period may be shortened and/or assisted by the application of elevated temperatures below 60° C. (140° F.), more preferably below 49° C. (120° F.), provided this does not entail any damage or alteration to the coat of the coating composition of the disclosure, such as premature thermal crosslinking, for instance.

In certain embodiments of the present disclosure, the crosslink density of the cured coating composition, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One of ordinary skill in the art should understand that the crosslink density can be determined by a variety of methods, such as dynamic mechanical thermal analysis (DMTA). The glass transition temperature and dynamic properties obtained from such methods are related to crosslink density of coating and to the structure of the crosslinked network.

The present disclosure further provides articles comprising the cured coating composition. For instance, the coatings of the disclosure may be used as accent coatings for automotive applications. Accent coatings may include coatings that provide contrast with other coatings. The accent coatings of the disclosure can exhibit optical effects, e.g. a matte appearance when applied alone, or a leathery appearance when overcoated with a clearcoat. The coating further exhibits tactile effects, creating a certain amount of grip or subjective "soft feel."

Coatings according to the disclosure may be applied to exterior and/or interior automotive parts. Such parts include exterior claddings or housings, and interior dashboards and door panels. When applied to an exterior part, the coating may be further coated with a clearcoat to enhance weatherability. Coating of the articles with the composition of the disclosure imparts the aforementioned optical and tactile effects.

The coatings of the disclosure may also be used as bed liners or underbody anti-chip coatings. The coating exhibits good adhesion and is protective against scratches, chipping, peeling and like damage caused by impact or abrasion. The coating protects against corrosion and degradation of vehicle surfaces, e.g. the vehicle bed or underbody. The tactile effect or grip exhibited by the coating of the disclosure provides good skid resistance when employed as a bed liner.

EXAMPLE

The following example illustrates one particular embodiment of the invention. The example is merely illustrative and does not in any way limit the scope of the disclosure as described and claimed. All parts are by weight unless explicitly stated to be on a different basis.

As shown in Table 1 below, a coating according to the disclosure was prepared. First, a clear resin-based paint was made by mixing an acrylic-based polyol emulsion polymer dispersion, urea formaldehyde resin, an additive package including barium sulfate, alkoxy fumed silica, sulfonic acid catalyst, UV protection additives, and an organic solvent blend until homogenous. The resulting mixture was labeled as "Part A." Pigmented acrylic-based slurry was then made by mixing acrylic-based polyol polymer, crumb rubber P9960CR from Prizmalite Industries, Inc., and organic aromatic solvent until homogenous. The resulting mixture was labeled as "Part B." The mixtures were then combined at a ratio of 1.2 parts "A" to 1 part "B" and mixed under agitation to provide a coating composition according to the disclosure.

TABLE 1

|  | WT % |
| --- | --- |
| PART A: CLEAR RESIN-BASED PAINT | |
| polyol emulsion acrylic polymer dispersion | 41.7 |
| urea formaldehyde resin | 28.0 |
| additive package[1] | 26.2 |
| organic solvent blend | 4.1 |
| TOTAL | 100.0 |
| PART B: PIGMENTED ACRYLIC-BASED SLURRY | |
| acrylic-based polyol polymer | 40.0 |
| organic aromatic solvent | 30.0 |
| crumb rubber pigment[2] | 30.0 |
| TOTAL | 100.0 |
| PART A | 54.6 |
| PART B | 45.4 |
| TOTAL | 100.0 |

[1]Additive package includes fillers, catalysts, and UV protection additives.
[2]Crumb Rubber P9960CR from Prizmalite Industries, Inc.

The coating composition was spray applied to metal panels. Following drying of the panels, a clearcoat was additionally applied to particular samples. All panels were then baked for 20 minutes at 130° C. to cure the coatings prior to evaluation and testing.

The bare coating according to the disclosure exhibited a matte appearance after curing. Subjective evaluation of the coating also revealed an unexpected tactile effect. The coating provided a "soft feel" to the panels. The panels having a clear overcoat also exhibited a leathery appearance.

The panels were subjected to a temperature of 100° F. and 100% relative humidity for 10 days. Adhesion testing was performed on the panels by scribing and peeling back the coatings. The coating composition of the present disclosure provided good adhesion.

Stone chip resistance testing was conducted in accordance with SAE J400, revised November 2002. The test consisted of projecting standardized road gravel by means of a controlled air blast onto the coated metal test panels. The degree of chipping after gravel impact was determined by visual comparison. Stone chip resistance was determined to be acceptable.

Short term weatherability testing was also performed in accordance with SAE J1960, revised October 2004. This test method specifies the operating procedures for accelerated weathering of automotive exterior materials through use of radiant exposure. A whitening effect was observed in bare coatings exposed in the short term durability study. Panels having an additional clearcoat over the coating exhibited a lesser whitening effect.

The disclosure has been described herein with reference to particular embodiments. It should be understood, however, that variations and modifications can be made within the spirit and scope of the disclosure.

What is claimed is:

1. A coating composition comprising
   (a) a binder component having hydroxyl-functional groups;
   (b) a curing agent having functional groups, wherein the functional groups of the curing agent are reactive with the hydroxyl-functional groups of the binder component; and
   (c) pulverized rubber in an amount of about 0.5% or greater by weight of the coating composition, the pulverized rubber having a particle size of at least about 200 U.S. mesh.

2. The coating composition according to claim 1, wherein the coating composition comprises a non-aqueous dispersion of the binder component.

3. The coating composition according to claim 2, wherein the nonaqueous dispersion comprises a hydroxyl-functional acrylic emulsion polymer dispersion.

4. The coating composition according to claim 1, wherein the curing agent comprises an aminoplast resin.

5. The coating composition according to claim 4, wherein the aminoplast resin comprises a urea formaldehyde resin.

6. The coating composition according to claim 1, wherein the pulverized rubber particles have a particle size of about 230 U.S. mesh.

7. The coating composition according to claim 1, wherein the compositions comprises the pulverized rubber in an amount between about 0.5% and about 35% by weight of the coating composition.

8. The coating composition according to claim 1, wherein the pulverized rubber is produced by a cryogenic process.

9. The coating composition according to claim 1, wherein the rubber particles are flakes.

10. The coating composition according to claim 1, wherein the pulverized rubber comprises pulverized whole tire rubber, the whole tire rubber comprising rubber from passenger and light truck tires.

11. The coating composition of claim 1, wherein the composition has a viscosity suitable for spraying.

12. An article comprising a coating, wherein the coating is formed from a composition comprising
   (a) a binder component having hydroxyl-functional groups;
   (b) a curing agent having functional groups, wherein the functional groups of the curing agent are reactive with the hydroxyl-functional groups of the binder component; and
   (c) pulverized rubber in an amount ranging from about 0.5% to about 35% by weight of the coating composition, the pulverized rubber having a particle size of at least about 200 U.S. mesh;
   wherein the composition is cured, thereby forming the coating.

13. The article according to claim 12, further comprising at least one additional coating.

14. The article according to claim 13, wherein the at least one addition coating comprises a clearcoat thereover.

15. The article according to claim 12, wherein the coating comprises an accent coating.

16. The article according to claim 15, wherein the accent coating has a tactile effect.

17. The article according to claim 15, wherein the accent coating has a matte appearance.

18. The article according to claim 15, wherein the accent coating has a leathery appearance.

19. The article according to claim 15, wherein the accent coating has a subjective soft feel.

20. The article according to claim 12, wherein the article comprises an automotive part.

21. The article according to claim 20, wherein the automotive part comprises a mirror housing.

22. The article according to claim 20, wherein the automotive part comprises a vehicle cladding.

23. The article according to claim 20, wherein the automotive part comprises an interior panel.

24. The article according to claim 23, wherein the interior panel is a dashboard.

25. The article according to claim 12, wherein the coating comprises a truck bed liner.

26. The article according to claim 12, wherein the coating comprises an anti-chip coating.

27. A process for preparing a coated article comprising
   applying to an article a coating composition comprising
   (a) a binder component having hydroxyl-functional groups;
   (b) a curing agent having functional groups, wherein the functional groups of the curing agent are reactive with the hydroxyl-functional groups of the binder component; and
   (c) pulverized rubber in an amount ranging from about 0.5% to about 35% by weight of the coating composition, the pulverized rubber having a particle size of 200 U.S. mesh; and
   curing the coating composition;
   wherein the coated article is prepared.

28. The process according to claim 27, wherein the curing comprises exposing the coating composition to thermal energy.

29. The process according to claim 27, wherein the step of applying the coating composition comprises spraying the coating composition.

30. The process according to claim 27, further comprising applying a second coating composition to the coated article prior to the curing step.

31. The process according to claim 30, wherein the second coating composition is a clearcoat.

* * * * *